US 10,812,360 B2

(12) United States Patent
Banatwala et al.

(10) Patent No.: US 10,812,360 B2
(45) Date of Patent: *Oct. 20, 2020

(54) MODIFYING AN ACTIVITY STREAM TO DISPLAY RECENT EVENTS OF A RESOURCE

(71) Applicant: International Business Machines Corporation, Armonk, NY (US)

(72) Inventors: Mustansir Banatwala, Hudson, NH (US); David A. Brooks, Arlington, MA (US); Joseph A. Russo, Westford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 66 days.

This patent is subject to a terminal disclaimer.

(21) Appl. No.: 15/894,740

(22) Filed: Feb. 12, 2018

(65) Prior Publication Data

US 2018/0212854 A1     Jul. 26, 2018

Related U.S. Application Data

(63) Continuation of application No. 14/172,513, filed on Feb. 4, 2014, now Pat. No. 9,948,537.

(51) Int. Cl.
*G06F 3/048*     (2013.01)
*H04L 12/26*    (2006.01)
*G06F 3/0481*   (2013.01)
*H04L 29/08*    (2006.01)

(52) U.S. Cl.
CPC ............ *H04L 43/10* (2013.01); *G06F 3/0481* (2013.01); *H04L 67/22* (2013.01)

(58) Field of Classification Search
CPC .......... G06F 3/048; H04L 43/10; H04L 67/22
See application file for complete search history.

(56) References Cited

U.S. PATENT DOCUMENTS

| | | | | |
|---|---|---|---|---|
| 8,281,372 | B1* | 10/2012 | Vidal | H04L 51/12 726/5 |
| 8,400,436 | B1* | 3/2013 | Kuck | H04H 60/06 345/204 |
| 8,817,065 | B1* | 8/2014 | Mo | H04W 4/21 348/14.08 |
| 2006/0041626 | A1 | 2/2006 | Chen et al. | |
| 2009/0183237 | A1* | 7/2009 | Cortes | G06F 9/453 726/4 |
| 2009/0222742 | A1 | 9/2009 | Pelton et al. | |
| 2010/0235235 | A1 | 9/2010 | Hosseini et al. | |
| 2010/0325560 | A1 | 12/2010 | Bryan | |
| 2011/0258016 | A1* | 10/2011 | Barak | G06Q 30/02 705/7.29 |
| 2011/0289142 | A1 | 11/2011 | Whalin | |
| 2012/0011477 | A1* | 1/2012 | Sivadas | G06F 3/015 715/866 |

(Continued)

*Primary Examiner* — Xuyang Xia
(74) *Attorney, Agent, or Firm* — Steven L. Nichols; Fabian VanCott

(57) ABSTRACT

Modifying an activity stream to display recent events of a resource includes checking-in a user to a resource to provide context about the resource, specifying a time duration for which the user is checked-in to the resource, and modifying, based on the time duration, an activity stream of the user to display recent events of the resource.

14 Claims, 6 Drawing Sheets

(56) References Cited

U.S. PATENT DOCUMENTS

| | | |
|---|---|---|
| 2012/0095979 A1 | 4/2012 | Aftab et al. |
| 2013/0060938 A1* | 3/2013 | McColgan ............ H04L 51/043 |
| | | 709/224 |
| 2013/0217416 A1* | 8/2013 | Matthews, III ....... H04W 4/025 |
| | | 455/456.2 |
| 2013/0332523 A1 | 12/2013 | Luu |
| 2014/0040786 A1 | 2/2014 | Swanson |
| 2014/0129942 A1* | 5/2014 | Rathod ............ H04N 21/44222 |
| | | 715/720 |
| 2014/0164972 A1 | 6/2014 | Lee |
| 2014/0282096 A1* | 9/2014 | Rubinstein ............ H04L 65/403 |
| | | 715/753 |

* cited by examiner

MODIFYING AN ACTIVITY STREAM TO DISPLAY RECENT EVENTS OF A RESOURCE

BACKGROUND

The present invention relates to modifying an activity stream, and more specifically, to modifying the activity stream to display recent events of a resource.

An activity stream allows a user to be aware of collaborative actions by other users. The activity stream displays information such that the user may become aware of the collaborative actions by the other users. The information that the activity stream displays includes information that the other users have posted such as comments, links, pictures, articles, events, other information, or combinations thereof.

BRIEF SUMMARY

A method for modifying an activity stream to display recent events of a resource includes checking-in a user to a resource to provide context about the resource, specifying a time duration for which the user is checked-in to the resource, and modifying, based on the time duration, an activity stream of the user to display recent events of the resource.

A system for modifying an activity stream to display recent events of a resource includes an checking-in engine to check-in a user to a resource to provide context about the resource, a specifying engine to specify a time duration for which the user is checked-in to the resource, a modifying engine to modify, based on the time duration, an activity stream of the user to display recent events of the resource, and a reverting engine to revert the activity stream of the user to display recent events unrelated to the resource after an expiration of the time duration.

A computer program product includes a computer readable storage medium, the computer readable storage medium having computer readable program code embodied therewith. The computer readable program code having computer readable program code to check-in a user to a resource to provide context about the resource, and modify, based on a time duration, an activity stream of the user to display recent events of the resource.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

Figure 1:
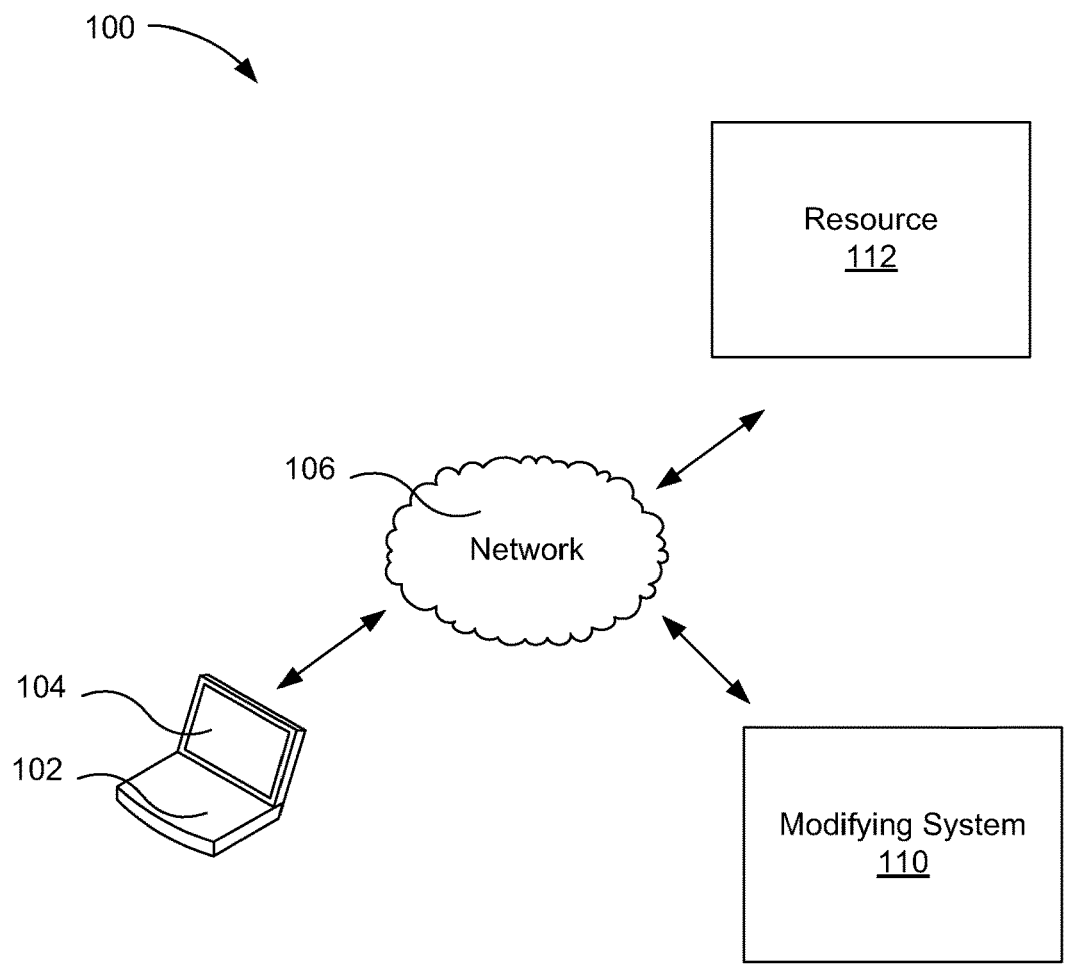
FIG. 1 is a diagram of an example of a system for modifying an activity stream to display recent events of a resource, according to one example of principles described herein.

The present specification describes a method and system for modifying an activity stream such that the activity stream displays recent events of a resource that a user is checked-in to.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, an activity stream displays information such that a user may become aware of collaborative actions by the other users. Further, the information to be displayed in the activity stream is usually prioritized in a chronological order. For example, the activity stream may display a comment before a link if the comment was posted before the link was posted.

Further, the activity stream may include hundreds of posts. With hundreds of posts in an activity stream prioritized in chronological order, the activity stream may not display information that is of interest to the user within the first few posts. As a result, the user views each post and decides if the post is of interest to the user. This can be a time consuming task for the user if the user desires to view posts related to a resource that the user is working on.

The principles described herein include a system and a method for modifying an activity stream to display recent events of a resource. Such a method includes checking-in a user to a resource to provide context about the resource, specifying a time duration for which the user is checked-in to the resource, and modifying, based on the time duration, an activity stream of the user to display recent events of the resource that the user is checked-in to. Such a method sets the context to current activities of a user. As a result, social collaboration may be brought to the resource by displaying the recent events of the resource that the user is checked-in to.

In the specification and appended claims, the term "resource" is meant to be understood broadly as an object that is of interest to a user. In one example, a resource may be a file, a forum, a text, an email, a web page, a community, a video, a picture, other resources, or combinations thereof.

In the specification and appended claims, the term "recent event" is meant to be understood broadly as information that is posted on a user's activity stream that is about a resource that a user has checked-in to. In one example, a recent event may include a comment, a link, an image, an article, other recent events, or combinations thereof about a resource that a user has checked-in to.

In the specification and appended claims, the term "check-in" is meant to be understood broadly as an implicit action or an explicit action to allow a user to express interest in a resource. In one example, a user may check-in to one resource or multiple resources at the same time.

In the specification and appended claims, the term "time duration" is meant to be understood broadly as a measurement of time for which a user may be checked-in to a resource. In one example, the time duration may be a default range of time such as one hour. In another example, the time duration may be a specific range of time such as from 1 p.m. to 6 p.m.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Referring now to the figures, FIG. 1 is a diagram of an example of a system for modifying an activity stream to display recent events of a resource, according to one example of principles described herein. As will be described below, a modifying system is in communication with a network to check-in a user to a resource to provide context about the resource. Further, the modifying system modifies, based on a time duration, an activity stream of the user to display recent events of the resource that the user is checked-in to.

As illustrated in FIG. 1, the system (100) includes a user device (102) with a display (102). In one example, the user device may be used to access, over a network (106), a resource (112). In one example the resource (112) may be a file, a forum, a text, an email, a web page, a community, a video, an image, or combinations thereof. In this example, the contents of the resource (112) may be displayed on the user device (102) via the display (104). For example, if the resource (112) is a web page, the contents of the web page are displayed on the display (104) of the user device (102).

Further, the display (104) on the user device (102) may display an activity stream. In one example, the activity stream allows a user to be aware of collaborative actions by other users. In this example, the collaborative actions of other users are displayed in a user's activity stream. As will be described in other parts of this specification, the activity stream may be displayed with the contents of the resource (112) via the display (104).

As illustrated in FIG. 1, the system (100) includes a modifying system (110). In one example, the modifying system (110) checks-in a user to the resource (112) to provide context about the resource (112). As will be described in later parts of this specification, the user may explicitly check-in to the resource (112), implicitly check-in to the resource (112), or combinations thereof.

Further, the modifying system (110) specifies a time duration for which the user is checked-in to the resource. As will be described in later parts of this specification specifying the time duration for which the user is checked-in to the resource includes specifying a default range of time, a specific range of time, or combinations thereof.

Further, the modifying system (110) modifies, based on the time duration, an activity stream of the user to display recent events of the resource that the user is checked-in to. As a result, social collaboration may be brought to the resource by displaying the recent events of the resource that the user is checked-in to.

While this example has been described with reference to the modifying system being located over the network, the modifying system may be located in any appropriate location according to the principles described herein. For example, the modifying system may be located in a user device, a server, a database, other locations, or combinations thereof.

While this example has been described with reference to the modifying system checking-in a user to one resource, the modifying system may check-in a user to multiple resources. For example, the user may check-in to five resources.

Figure 2:
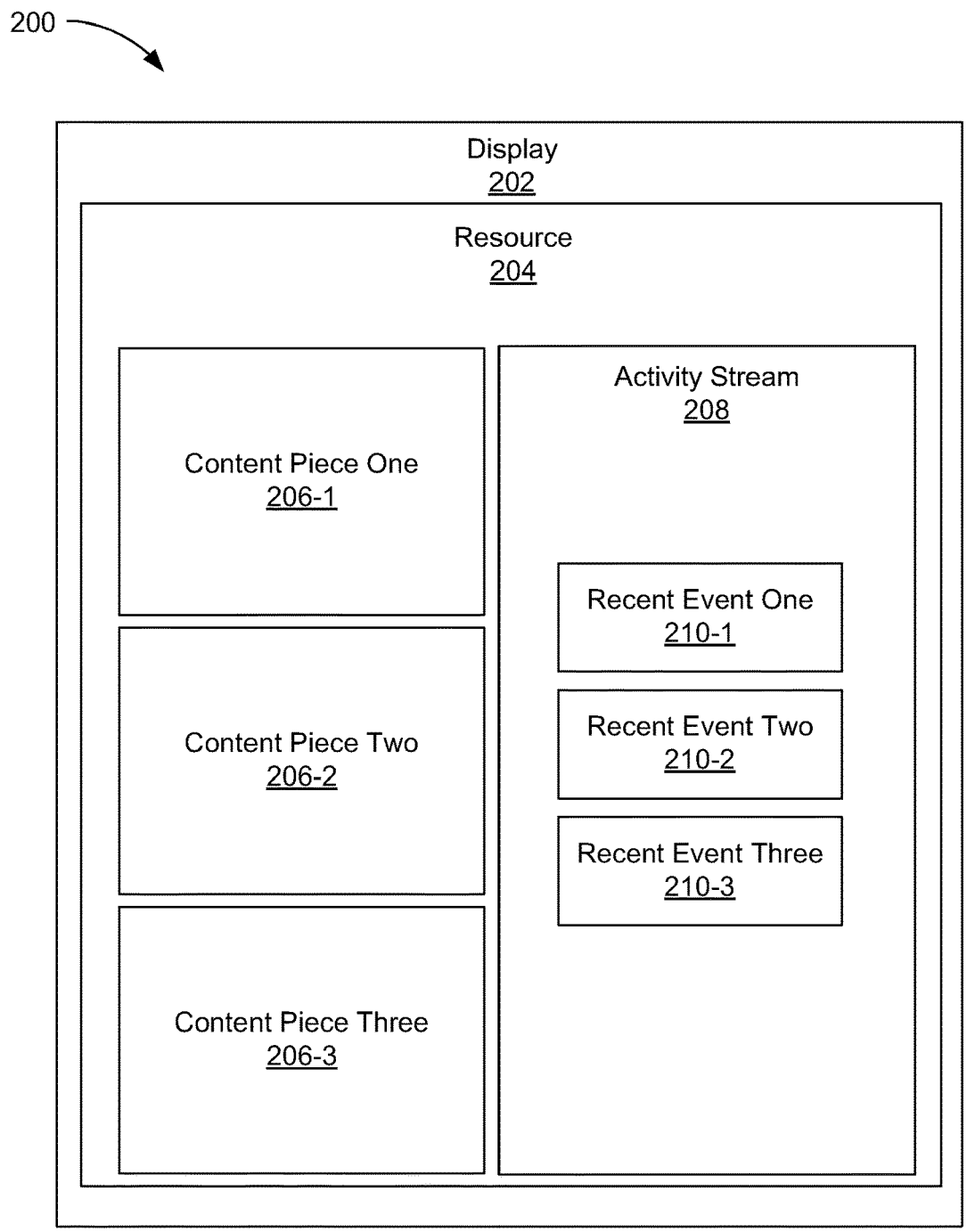
FIG. 2 is a diagram of an example for modifying an activity stream to display recent events of a resource, according to one example of principles described herein.

FIG. 2 is a diagram of an example for modifying an activity stream to display recent events of a resource, according to one example of principles described herein. As mentioned above, a modifying system is in communication with a network to check-in a user to a resource to provide context about the resource. Further, the modifying system modifies, based on a time duration, an activity stream of the user to display recent events of the resource that the user is checked into.

Turning specifically to FIG. 2, a display (202) on the user device may display an activity stream (208). In one example, the activity stream (208) allows a user to be aware of collaborative actions by other users. Further, the activity stream (208) may be displayed along with content pieces (206) of a resource (204).

As illustrated in FIG. 2, the display (202) may display a resource (204). In this example the resource (204) may be a web page and include a number of content pieces (206). The content pieces (206) may be information that the resource (204) is to display. For example, content piece one (206-1) may be an image of a bicycle. Content piece two (206-2) may be a text description of content piece one (206-1). Further, content piece three (206-3) may be a hyper link that directs a user to a web page where the user may purchase the image of the bicycle.

As mentioned above, the modifying system (110) of FIG. 1 modifies, based on the time duration, an activity stream (208) of the user to display recent events of the resource that the user is checked-in to. For example, a user and three other users, namely user one, user two, and user three may be checked-in to the resource (204). In one example, user one may comment about how the bicycle is green. As a result, the activity stream (208) of the user may display user one's comment as recent event one (210-1).

In keeping with the given example, user two may comment and state that the hyper link contained in content piece three (206-3) does not work. Further, user two may further include, in the comment, a new hyper link directing a user to another web page that sells the image of the bicycle. In this example, the activity stream (208) of the user may display user two's comment as recent event two (210-2).

In keeping with the given example, user three may post a picture of an image of red bicycle and state that the red bicycle is better looking than the green bicycle contained in content piece one (206-1). In this example, the activity stream (208) of the user may display user three's comment as recent event three (210-3).

As will be described on other parts of this specification, the modifying system (110) of FIG. 1 reverts the activity stream (208) of the user to display events unrelated to the resource after an expiration of the time duration. As a result, if the user is no longer checked-in to a resource after a specified amount of time, the user's activity stream does no longer displays recent events for the resource.

While this example has been described with reference to the activity stream being displayed along with the resource, the activity stream may be displayed in any appropriate location. For example, the activity stream may be displayed on another web page, on a desktop, in an application, other locations, or combinations thereof.

Figure 3:
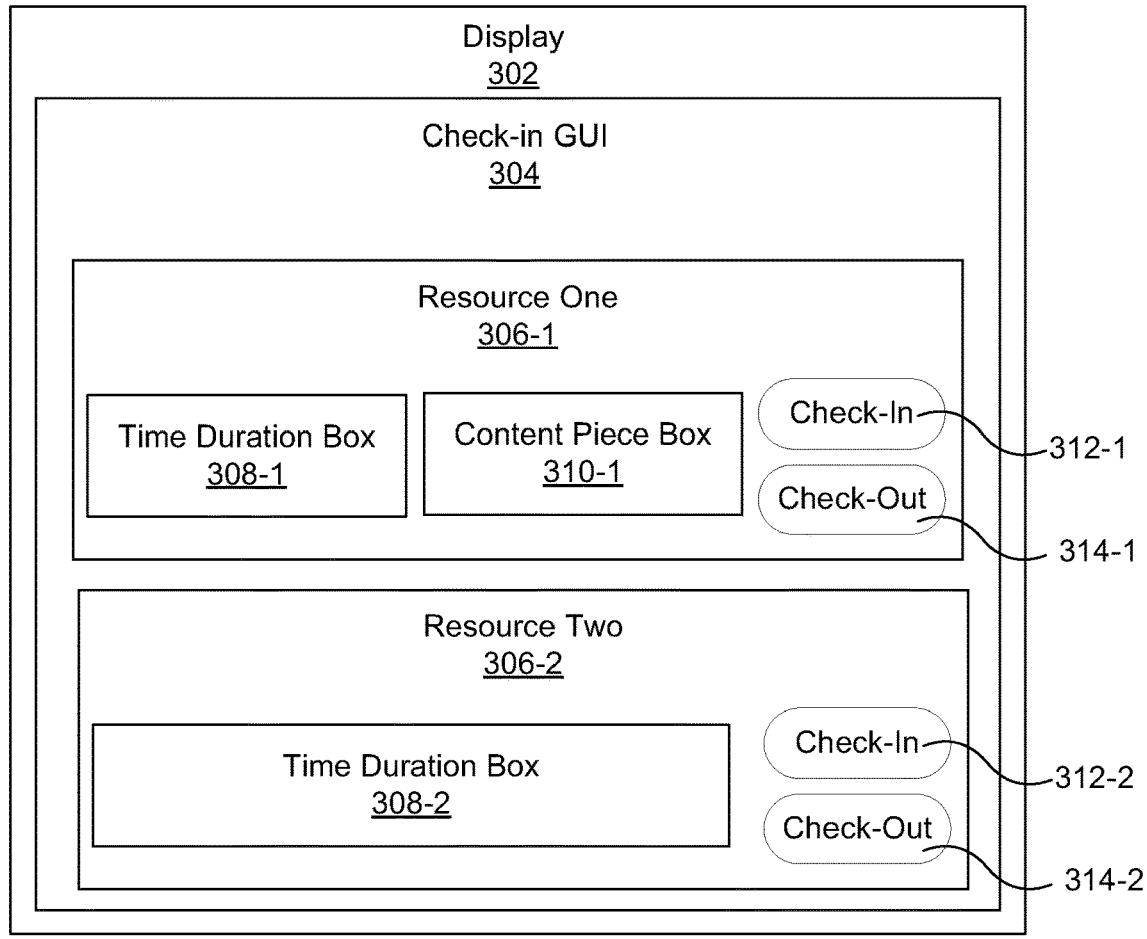
FIG. 3 is a diagram of an example for checking a user into a resource, according to one example of principles described herein.

FIG. 3 is a diagram of an example for checking-in a user to a resource, according to one example of principles described herein. As mentioned above, the modifying system (110) of FIG. 1 allows a user to check-in to the resource to provide context about the resource. As will be described in later parts of this specification, the user may explicitly check-in to the resource, implicitly check-in to the resource, or combinations thereof.

As illustrated in FIG. 3, a display (302) may display a check-in graphical user interface (GUI) (304). The check-in GUI (304) displays resources (306) that the user may check-in to. For example, the user may check-in to resource one (306-1) and resource two (306-2).

In one example, resource one (306-1) may be an email account of a user. In this example, the user may specify a duration of time via a time duration box (308-1) to specify a time for which the user is checked-in to resource one (306-1). In one example, the time duration box (308-1) allows the user to specify a range of time. For example, the user may specify that resource one (306-1) is to be check-in to for 8 hours. In another example, the user may specify that resource one (306-1) is to be check-in to for three days. Further, if, the user does not specify that resource one (306-1) is to be check-in to for a specific range of time, a default range of time may be specified by the modifying system (110) of FIG. 1. For example, one hour may be specified as the default range of time.

In keeping with the given example, resource one (306-1) may allow a user to check-in to a specific content piece of resource one (306-1). In this example, a content piece box (310-1) is provided to allow a user to check-in to a content piece of resource one (306-1).

Further, the check-in GUI (304) for resource one (306-1) may include a check-in button (312-1). Once the user has entered in all the information for resource one (306-1), the user may selected the check-in button (312-1) to check-in to resource one (306-1). As a result, the activity stream of the user is modified to display recent events related to resource one (306-1).

Further, the check-in GUI (304) for resource one (306-1) may include a check-out button (314-1). In one example, if the user desires to no longer be checked-in to resource one (306-1) before the time duration has expired, the user may select the check-out button (314-1). As a result, the activity stream of the user is reverted to display events unrelated to resource one (306-1).

As mentioned above, the check-in GUI (304) displays resources (306) that the user may check-in to. In one example, resource two (306-2) may be a specific web page. In this example, the user may specify a duration of time via a time duration box (308-2) to specify a time duration for which the user is checked-in to resource two (306-2). As mentioned above, the time duration box (308-2) allows the user to specify a range of time. For example, the user may specify that resource two (306-2) is to be check-in to for 30 minutes. In another example, the user may specify that resource two (306-2) is to be check-in to whenever the user accesses the web page. Further, if the user does not specify that resource two (306-2) is to be check-in to for a specific range of time, a default range of time may be specified by the modifying system (110) of FIG. 1. For example, the default range of time may be three hours.

Further, the check-in GUI (304) for resource two (306-2) may include a check-in button (312-2). Once the user has entered in all the information for resource two (306-2), the user may selected the check-in button (312-2) to check-in to resource two (306-2). As a result, the activity stream of the user is modified to display recent events of the resource two (306-2).

Further, the check-in GUI (304) for resource two (306-2) may include a check-out button (314-2). In one example, if the user desires to no longer be checked-in to resource two (306-2) before the time duration has expired, the user may select the check-out button (314-2). As a result, the activity stream of the user is reverted to display events unrelated to resource two (306-2).

While this example has been described with reference to the user explicitly checking-in to a resource via a check-in GUI, the user may implicitly check-in to a resource implicitly. For example, by viewing a resource the user may implicitly indicate an interest in the resource. More information about implicitly checking-in to a resource will be described in later parts of this specification.

Figure 4:
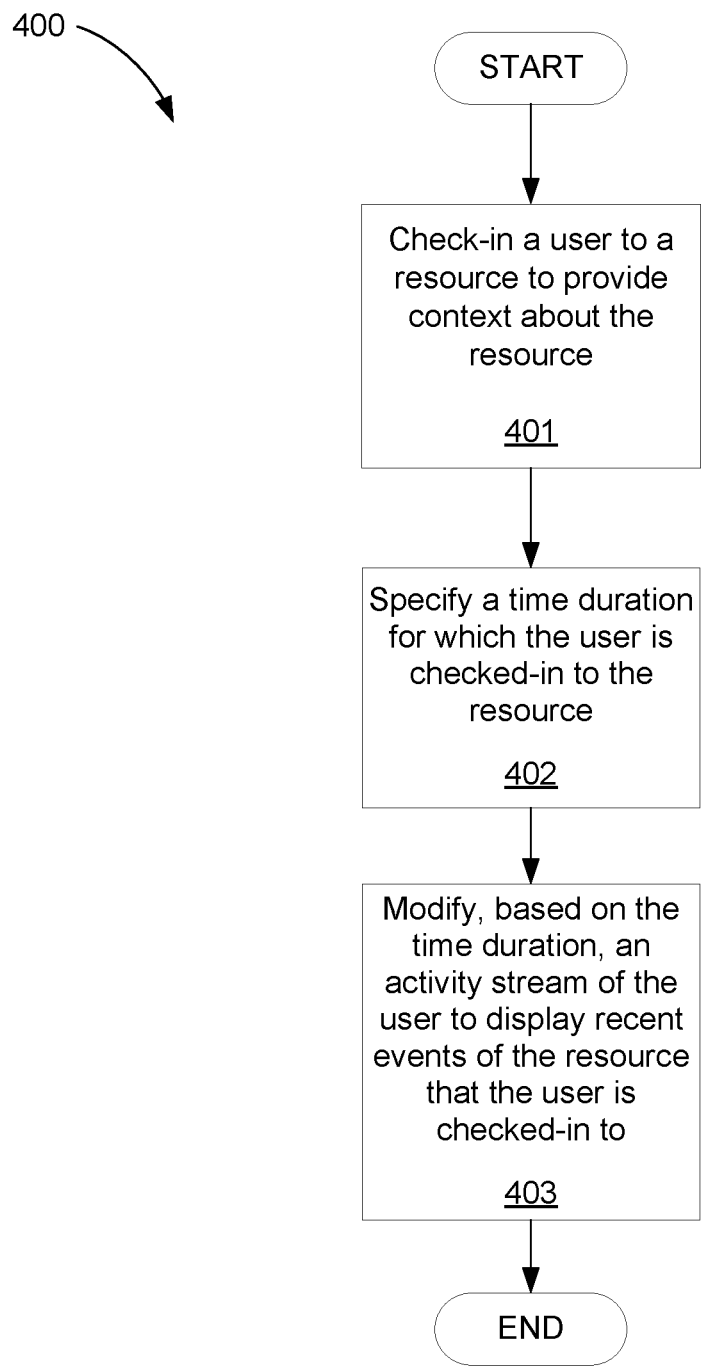
FIG. 4 is a flowchart of an example of a method for modifying an activity stream to display recent events of a resource, according to one example of principles described herein.

FIG. 4 is a flowchart of an example of a method for modifying an activity stream to display recent events of a resource, according to one example of principles described herein. In one example, the method (400) may be executed by the modifying system (110) of FIG. 1. In other example, the method (400) may be executed by other systems such as system 600 or system 700. In this example, the method (400) includes checking-in (401) a user to a resource to provide context about the resource, specifying (402) a time duration for which the user is checked-in to the resource, and modifying (403), based on the time duration, an activity stream of the user to display recent events of the resource that the user is checked-in to.

As mentioned above, the method (400) includes checking-in (401) a user to a resource to provide context about the resource. In one example, a user explicitly checks-in to the resource. As mentioned above, a check-in GUI may be providing to allow the user to explicitly check-in to the resource. In one example, the check-in GUI may be displayed as an application separate from the resource. In another example, the GUI may be displayed along with the resource.

In another example, a user implicitly checks-in to the resource. For example, is a user visits a resource, the user is implicitly checked-in to the resource. In another example, if a user is associated with a resource, such as an email, the user implicitly checks-in to the email upon login on to the email. As a result, by checking-in to a resource, the user provides context by expresses interest in the resource.

As mentioned above, the method (400) includes specifying (402) a time duration for which the user is checked-in to the resource. In one example, specifying a range of time for which the user is checked-in to the resource includes a specifying a default range of time. For example, for all resources that a user checks-in to, a default range of time for which the user is checked-in to the resources may be one hour. In one example, the modifying system (110) of FIG. 1 may specify a default range of time.

In another example, specifying the time duration for which the user may be checked-in to the resource includes modifying the default range of time to specify a specific range of time for which the user is checked-in to the resource. In this example, the specific range of time may be based on minutes, hours, days, months, years, or combinations thereof.

In yet another example, specifying a time duration for which the user is checked-in to the resource may be based on an event. For example, if a user checks-in to a resource such as an email account, the time duration may be from the time the user logs on to the email account to the time the user logs off of the email account.

As mentioned above, the method (400) includes modifying (403), based on the time duration, an activity stream of the user to display recent events of the resource that the user is checked-in to. In one example, modifying the activity stream includes prioritizing, in the activity stream, recent events of the resource such that the recent events of the resource are displayed before other events unrelated to the resource. For example, an activity stream may contain three events unrelated to a resource and two recent events related to the resource which a user has checked-in to. In this example, the activity stream is modified to display the two recent events related to the resource before the three events unrelated to the resource.

In another example, the activity stream displays only recent events related to the resource which a user has checked-in to. As a result, other events that are unrelated to the resource are not displayed. Further, the recent events may include the name of the user who posted the recent events. As a result, the user may further contact the user who posted the recent events to ask any questions regarding the resource.

Figure 5:
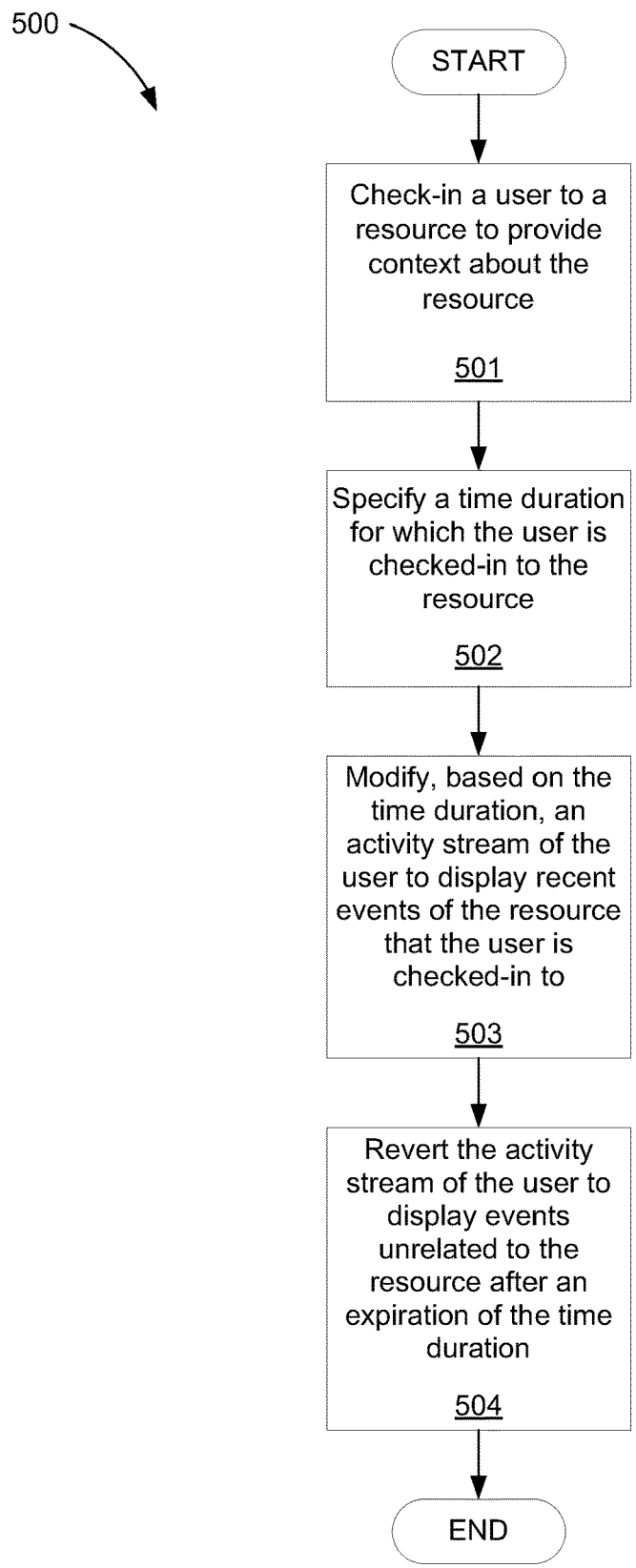
FIG. 5 is a flowchart of an example of a method for modifying an activity stream to display recent events of a resource, according to one example of principles described herein.

FIG. 5 is a flowchart of an example of a method for modifying an activity stream to display recent events of a resource, according to one example of principles described herein. In one example, the method (500) may be executed by the modifying system (110) of FIG. 1. In other example, the method (500) may be executed by other systems such as system 600 or system 700. In this example, the method (500) includes checking-in (501) a user to a resource to provide context about the resource, specifying (502) a time duration for which the user is checked-in to the resource, modifying (503), based on the time duration, an activity stream of the user to display recent events of the resource that the user is checked-in to, and reverting (504) the activity stream of the user to display events unrelated to the resource after an expiration of the time duration.

As mentioned above, the method (500) includes reverting (504) the activity stream of the user to display events unrelated to the resource after an expiration of the time duration. As mentioned above, a user may be checked-in to a resource for according to a time duration. During the time duration, the user's activity stream is modified to display recent events of the resource that the user is checked-in to. However, once the time durations expires, indicating the resource is no longer of interest to the user, the activity stream no longer displays recent events related to the resource. As a result, the activity stream of the user reverts to display events unrelated to the resource.

Figure 6:
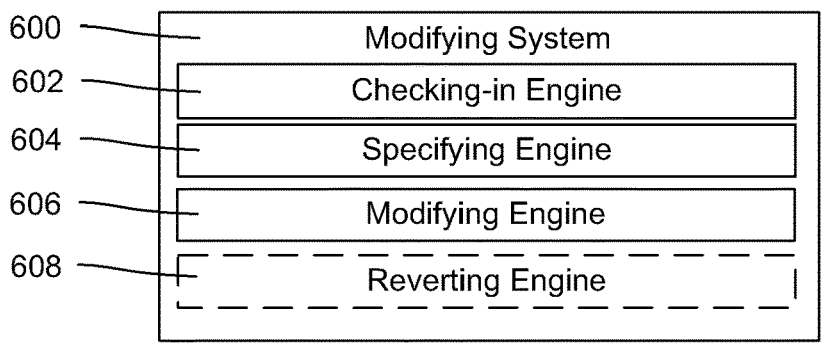
FIG. 6 is a diagram of an example of a modifying system, according to one example of principles described herein.

FIG. 6 is a diagram of an example of a modifying system (600), according to one example of principles described herein. The modifying system (600) includes a checking-in engine (602), a specifying engine (604), and a modifying engine (606). In this example, the modifying system (600) also includes a reverting engine (608). The engines (602, 604, 606, 608) refer to a combination of hardware and program instructions to perform a designated function. Each of the engines (602, 604, 606, 608) may include a processor and memory. The program instructions are stored in the memory and cause the processor to execute the designated function of the engine.

The checking-in engine (602) checks-in a user to a resource to provide context about the resource. In one example, the checking-in engine (602) checks-in a user to one resource. In another example, the checking-in engine (602) checks-in a user to multiple resources. Further, the checking-in engine (602) may explicitly check-in a user to the resource, implicitly check-in the user to the resource, or combinations thereof.

The specifying engine (604) specifies a time duration for which the user is checked-in to the resource. In one example, the specifying engine (604) specifies a default range of time for which the user is checked-in to the resource, a specific range of time for which the user is checked-in to the resource, or combinations thereof.

The modifying engine (606) modifies, based on the time duration, an activity stream of the user to display recent events of the resource. In one example, the modifying engine (606) modifies one activity stream for a user. In another example, the modifying engine (606) modifies multiple activity streams for a user.

The reverting engine (608) reverts the activity stream of the user to display recent events unrelated to the resource after an expiration of the time duration. In one example, the reverting engine (608) reverts one activity stream for a user after an expiration of the time duration. In another example, the reverting engine (608) reverts several activity streams for a user after an expiration of the time duration.

Figure 7:
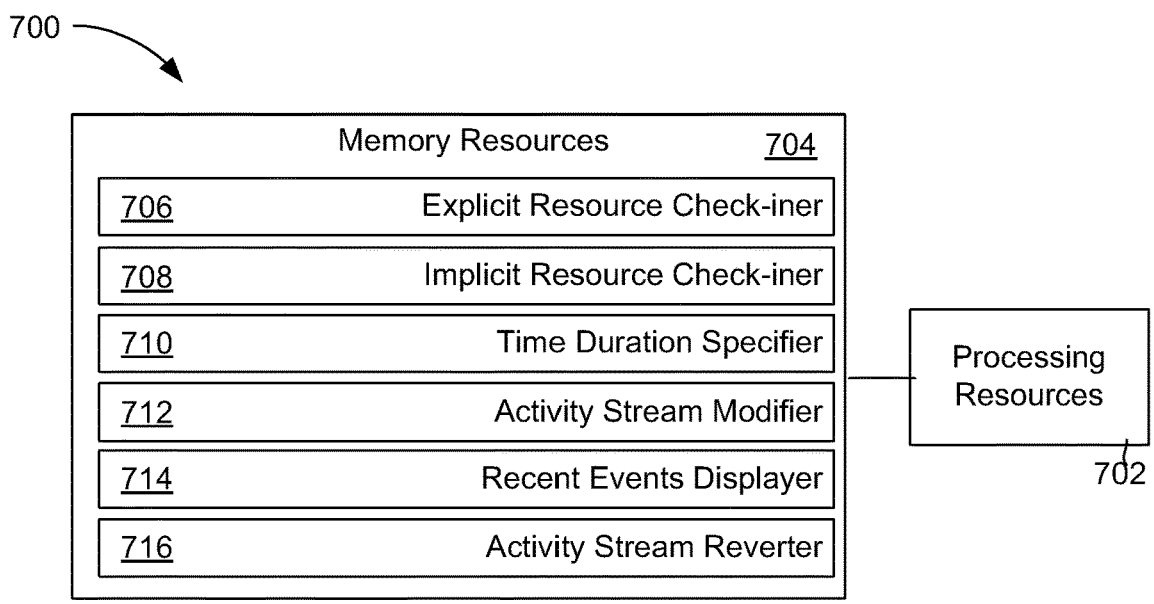
FIG. 7 is a diagram of an example of a modifying system, according to one example of principles described herein.

FIG. 7 is a diagram of an example of a modifying system (700), according to one example of principles described herein. In this example, the modifying system (700) includes processing resources (702) that are in communication with memory resources (704). Processing resources (702) include at least one processor and other resources used to process programmed instructions. The memory resources (704) represent generally any memory capable of storing data such as programmed instructions or data structures used by the modifying system (700). The programmed instructions shown stored in the memory resources (704) include an explicit resource check-iner (706), an implicit resource check-iner (708), a time duration specifier (710), an activity stream modifier (712), a recent events displayer (714), and an activity stream reverter (716).

The memory resources (704) include a computer readable storage medium that contains computer readable program code to cause tasks to be executed by the processing resources (702). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The explicit resource check-iner (706) represents programmed instructions that, when executed, cause the processing resources (702) to explicitly check-in a user to a resource. The implicit resource check-iner (708) represents programmed instructions that, when executed, cause the processing resources (702) to implicitly check-in a user to a resource.

The time duration specifier (710) represents programmed instructions that, when executed, cause the processing resources (702) to specify a time duration for which the user is to be checked-in to the resource. The activity stream modifier (712) represents programmed instructions that, when executed, cause the processing resources (702) to modify, based on a time duration, an activity stream of the user.

The recent events displayer (714) represents programmed instructions that, when executed, cause the processing resources (702) to display recent events of the resource in the user's activity stream. The activity stream reverter (716) represents programmed instructions that, when executed, cause the processing resources (702) to revert the activity stream of the user to display events unrelated to the resource after an expiration of the time duration.

Further, the memory resources (704) may be part of an installation package. In response to installing the installation package, the programmed instructions of the memory resources (704) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (702) and the memory resources (704) are located within the same physical component, such as a server, or a network component. The memory resources (704) may be part of the physical component's main memory, caches, registers, non-volatile memory, or elsewhere in the physical component's memory hierarchy. Alternatively, the memory resources (704) may be in communication with the processing resources (702) over a network. Further, the data structures, such as the libraries, may be accessed from a remote location over a network connection while the programmed instructions are located locally. Thus, the modifying system (700) may be implemented on a user device, on a server, on a collection of servers, or combinations thereof.

The modifying system (700) of FIG. 7 may be part of a general purpose computer. However, in alternative examples, the modifying system (700) is part of an application specific integrated circuit.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicated otherwise. It will be further understood that the terms "comprises" and/or "comprising" when used in the specification, specify the presence of stated features, integers, operations, elements, and/or components, but do not preclude the presence or addition of a number of other features, integers, operations, elements, components, and/or groups thereof.

What is claimed is:

1. A system of modifying an activity stream to display recent events of a resource, the system being separate from the resource and comprising:
   a checking-in engine to check-in a user, based on a user action, to the resource that the user wants to monitor to provide context about the resource, wherein the user action includes selecting a check-in button displayed for the resource in a user interface associated with an activity stream of the user, wherein the user interface comprises the check-in button, a check-out button, and a time duration box;
   a specifying engine to specify a time duration for which the user is checked-in to the resource;
   a modifying engine to modify, based on the time duration, the activity stream of the user to display recent events of the resource, wherein the activity stream is a stream of posts made by other users in a social collaboration and the resource is a resource outside of a social network supporting the social collaboration, wherein the modifying engine is to sort the activity stream by check-in status and then in chronological order and
   a reverting engine to revert the activity stream of the user by ceasing to modify the activity stream based on posts related to the resource after an expiration of the time duration.

2. The system of claim 1, in which the resource is a file, a forum, a text, an electronic mail (email), a web page, a community, a video, an image, or combinations thereof.

3. The system of claim 1, in which the time duration specifies a default range of time for which the user is checked-in to the resource.

4. The system of claim 1, in which the resource is an email account and the time duration is a range of time during which the user is logged-in to the email account.

5. The system of claim 1, wherein the reverting engine further comprises the check-out button in the graphic user interface which reverts the activity stream of the user prior to expiration of the time duration.

6. A product of modifying an activity stream to display recent events of a resource, comprising:
   a non-transitory computer readable storage medium, said computer readable storage medium comprising computer readable program code embodied therewith, said computer readable program code comprising program instructions that, when executed, causes a processor to:
   accept explicit user input to check-in the user to the resource indicating that the user wants notice of events related to the resource, to provide context about the resource, to be added to an activity stream of the user, wherein the activity stream is a chronologically-organized stream of posts made by other users in a social collaboration and wherein the resource is an email account, wherein a user interface to check-in the user comprises a check-in button, a check-out button, and a time duration box;
   modify, based on a time duration, the activity stream of the user to display notice of recent events of the resource within the activity stream, wherein modifying the activity stream includes prioritizing, in the activity stream, recent events of the resource such that the recent events of the resource are displayed before other events unrelated to the resource; and
   accept user input checking the user out of the resource via the check-out button and cease modifying the activity stream.

7. The product of claim 6, further comprising computer readable program code comprising program instructions that, when executed, cause said processor to display content from the resource along with the activity stream.

8. The product of claim 6, further comprising computer readable program code comprising program instructions that, when executed, cause said processor to accept the user accessing the resource as input to check-in the user to the resource.

9. The product of claim 6, further comprising computer readable program code comprising program instructions that, when executed, cause said processor to revert the activity stream of the user to display events unrelated to the resource after an expiration of the time duration.

10. A modifying system comprising:
a processor; and
memory resources for the processor;
the processor, using the memory resources, to:
check a user into a specific resource associated with an activity stream of the user in response to the user activating a check in button, wherein a graphic user interface comprises the check in button, a check out button, and a time duration box, wherein the user receives the activity stream comprising information posted by other users in a social collaboration, wherein a length of time the user is checked-in depends on a type of resource of the specific resource;
modify the activity stream to include, along with the posts by other users, notification of an event of the specific resource to which the user has checked-in such that notifications associated with the specific resource are displayed prior to notifications not associated with the specific resource in the activity stream; and
present the check-out button in the graphical user interface which causes the processor to stop modifying the activity stream in response to the user activating the check out button.

11. The modifying system of claim 10, the processor, using the memory resources, further to set a time duration, associated with the user checking into the specific resource, during which to modify the activity stream with posts by other users that relate to that resource and to stop modifying the activity stream and revert the activity stream to an unmodified state after the time duration.

12. The modifying system of claim 11, wherein the time duration is input by the user.

13. The modifying system of claim 11, wherein the time duration is a default value set by the modifying system.

14. The modifying system of claim 10, wherein the modifying system checks the user into the specific resource based on the user accessing that resource.

* * * * *